(12) United States Patent
Keiser et al.

(10) Patent No.: US 9,380,082 B1
(45) Date of Patent: Jun. 28, 2016

(54) REMOTE MULTI-PARTY AND/OR EVENT-DRIVEN VISITATION FOR RESIDENTS OF CONTROLLED-ENVIRONMENT FACILITIES

(71) Applicant: Securus Technologies, Inc., Dallas, TX (US)

(72) Inventors: Luke Keiser, Frisco, TX (US); Matthew R. Smith, McKinney, TX (US)

(73) Assignee: SECURUS TECHNOLOGIES, INC., Dallas, TX (US)

( * ) Notice: Subject to any disclaimer, the term of this patent is extended or adjusted under 35 U.S.C. 154(b) by 242 days.

(21) Appl. No.: 14/060,323

(22) Filed: Oct. 22, 2013

(51) Int. Cl.
*H04N 7/15* (2006.01)
*H04L 29/06* (2006.01)
*H04N 7/18* (2006.01)

(52) U.S. Cl.
CPC ............ *H04L 65/1069* (2013.01); *H04N 7/181* (2013.01)

(58) Field of Classification Search
CPC combination set(s) only.
See application file for complete search history.

(56) References Cited

U.S. PATENT DOCUMENTS

| 2005/0114192 A1* | 5/2005 | Tor et al. ............................ 705/8 |
| 2006/0087554 A1* | 4/2006 | Boyd et al. ................. 348/14.09 |
| 2007/0285504 A1* | 12/2007 | Hesse ......................... 348/14.08 |
| 2008/0201158 A1* | 8/2008 | Johnson et al. .................... 705/1 |
| 2011/0096139 A1* | 4/2011 | Rudolf ........................ 348/14.11 |

* cited by examiner

*Primary Examiner* — Joseph J Nguyen
(74) *Attorney, Agent, or Firm* — Fogarty, L.L.C.

(57) ABSTRACT

Remote multi-party and/or event-driven visitation for controlled-environment facilities. In some embodiments, a method may include receiving a request to initiate a remote group visitation session between a resident of a controlled-environment facility and two or more non-residents of the controlled-environment facility. The method may also include enabling the remote group visitation session, wherein during the session the resident is allowed to communicate with the two or more non-residents.

20 Claims, 4 Drawing Sheets

US 9,380,082 B1

REMOTE MULTI-PARTY AND/OR EVENT-DRIVEN VISITATION FOR RESIDENTS OF CONTROLLED-ENVIRONMENT FACILITIES

TECHNICAL FIELD

This specification relates generally to controlled-environment facilities, and, more particularly, to systems and methods for remote multi-party and/or event-driven visitation for residents of controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install communication devices in different parts of the facility. Such communication devices are generally dedicated to provide inmate contact with the outside world. These devices are typically located in different areas throughout the facility. At the time of a scheduled visitation, an officer may physically move the inmate from his or her cell or to a communication device or station in a designated area within the correctional facility, where he or she may be able to conduct a remote visitation with friends, family, acquaintances, etc. When the communication is over, the officer may then escort the inmate back to his or her cell.

SUMMARY

Embodiments disclosed herein are directed to remote multi-party and/or event-driven visitation for residents of controlled-environment facilities. In an illustrative, non-limiting embodiment, a method may include receiving a request to initiate a remote group visitation session between a resident of a controlled-environment facility and two or more non-residents of the controlled-environment facility, and enabling the remote group visitation session, wherein during the session the resident is allowed to communicate with the two or more non-residents.

For example, the controlled-environment facility may be a correctional facility and the resident may be a prisoner, inmate, detainee, or arrestee. The request may be originated by the resident. Additionally or alternatively, the request may be originated by one of the two or more non-residents. Also, the remote group visitation session may include a video conference.

In some cases, the request may include at least one of: a date of the remote group visitation session, a time of the remote group visitation session, or a duration of the remote group visitation session. For instance, the request may indicated an event associated with the remote group visitation session, and/or the event may be a birthday, funeral, wedding, or graduation. Additionally or alternatively, the event may include a television program, a home video presentation, a slideshow presentation, or a motion picture, and during the session the resident and the two or more non-residents may be allowed to view the event concurrently.

In some embodiments, the method may include billing the resident or at least one of the two or more non-residents at least in part depending upon a number of persons participating in the remote group visitation session. Additionally or alternatively, the method may include billing the resident or at least one of the two or more non-residents at least in part depending upon a number of communication devices involved in the remote group visitation session.

In another illustrative, non-limiting embodiment, a visitation system may include at least one processor and a memory coupled to the at least one processor. The memory may be configured to store program instructions executable by the at least one processor to cause the video visitation system to receive a request to initiate a video visitation session between at least one resident of a correctional facility and at least one non-resident of the correctional facility, wherein the request indicates an event associated with the video visitation session; and to enable the video visitation session, wherein during the session the at least one resident is allowed to communicate with the at least one non-resident and to remotely attend or participate in the event.

The program instructions may be further executable by the at least one processor to cause the video visitation system to, prior to receiving the request, provide information to the at least one resident or the at least one non-resident about an available schedule for the video visitation session. The event may be selected from the group consisting of: birthday, funeral, wedding, and graduation. Additionally or alternatively, the event may include a television program, a home video presentation, a slideshow presentation, and a motion picture and, during the session, the resident and the two or more non-residents may be allowed to view the event simultaneously.

In another illustrative, non-limiting embodiment, a tangible computer-readable storage medium may have program instructions stored thereon that, upon execution by a computer-based visitation system, cause the computer-based visitation system to enable a video visitation session between at least one resident of a correctional facility and at least one non-resident of the correctional facility; and bill the at least one resident or the at least one non-resident for the video visitation session at least in part depending upon a number of persons or devices involved in the video visitation session.

For example, the request may indicate an event associated with the video visitation session. The program instructions, upon execution, may further cause the computer-based video visitation system to bill the at least one resident or the at least one non-resident for the video visitation session at least in part depending upon a type or duration of the event. The event may a birthday, funeral, wedding, graduation, television program, home video presentation, slideshow presentation, or a motion picture.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

Figure 1:
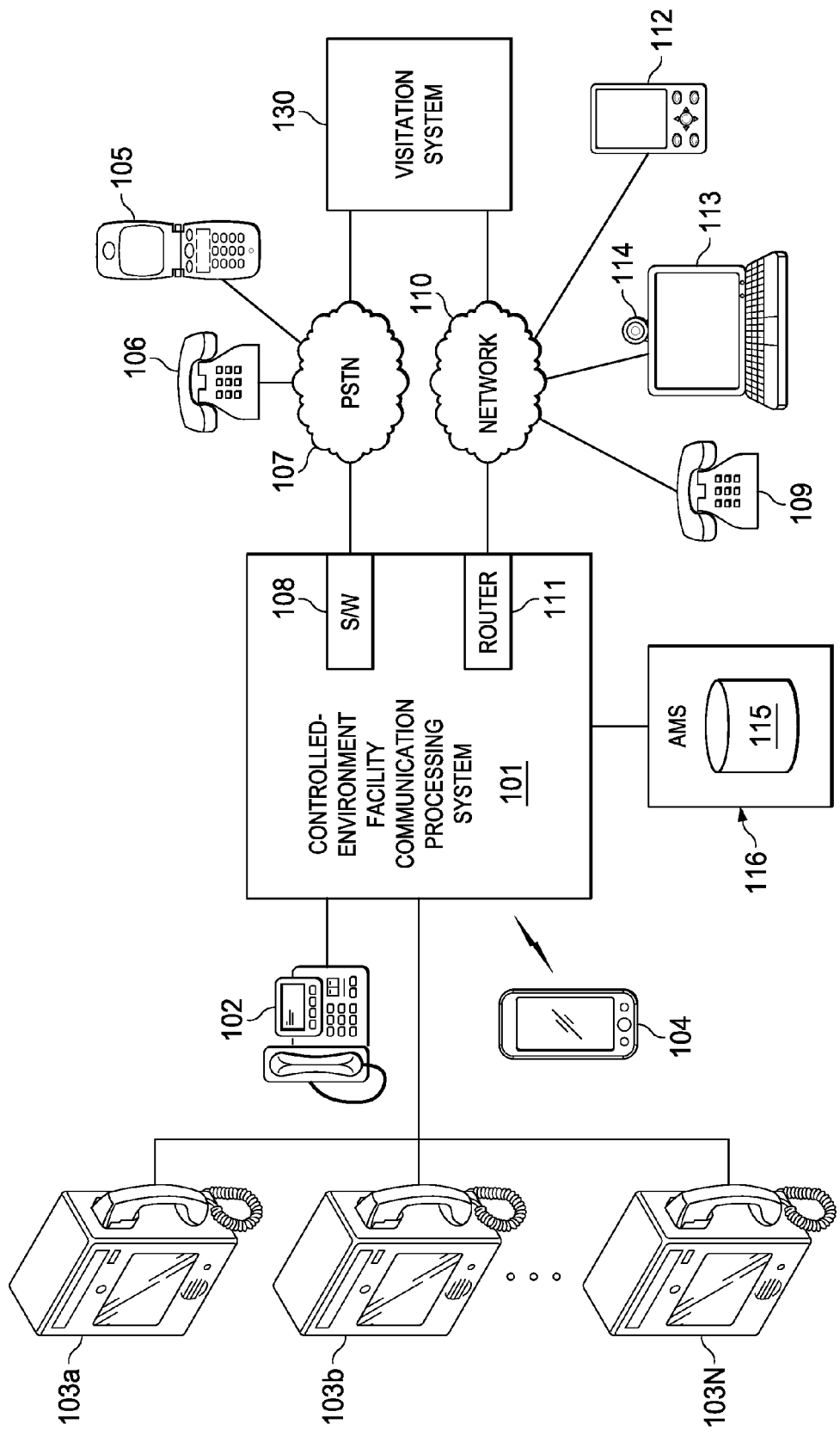
FIG. 1 is a block diagram of an example of an environment where a visitation system may be employed according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses remote multi-party and/or event-driven visitation for residents of controlled-environment facilities. Various types of controlled environment facilities are present in today's society, and persons may be voluntary or involuntary residents of such facilities, whether temporarily or permanently. Examples of controlled environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled environment facility may be referred to as a jail or prison, and its residents may be referred to as arrestees, detainees, or inmates.

The inventors hereof have recognized that correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments.

As such, some of the systems and methods described herein may be specifically tailored to address one or more of the aforementioned needs and challenges. It should be understood, however, that other systems and methods described herein may also be applicable to other types of controlled environment facilities and their respective residents (e.g., a hospital and its patients) and, in some cases, may be applicable to environments that are not controlled at all.

Turning now to FIG. 1, a block diagram of an illustrative environment where a visitation system may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102 and 104 may be capable of connecting to a non-resident's (i.e., a person not incarcerated or otherwise committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Video visitation devices 103a-n (each collectively referred to as "video visitation device 103") may have video conferencing capabilities to enable inmates to participate in video visitation sessions with non-residents of the correctional facility via video communication, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to providing certain visitation and communication operations, communication processing system 101 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 115 maintained by Administration and Management System (AMS) 116. In addition to PAC list(s), AMS 116 may also store resident profile data (RPD), as well as communication and/or visitation rules applicable to each resident.

As an example, in the context of a correctional facility, AMS 116 is referred to as a Jail Management System (JMS). Within the AMS or JMS 116, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitation sessions (e.g., as electronic video files). In scenarios where communication system 101 is located within the controlled-environment facility, it may have direct access to AMS or JMS 116. In other embodiments, however, communication system 101 may be located remotely with respect to the controlled-environment facility, and access to AMS or JMS 116 may be obtained via a computer network such as, for example, network 110.

In some embodiments, video visitation devices 103 may be implemented as a computer-based system. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be an suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Figure 2:
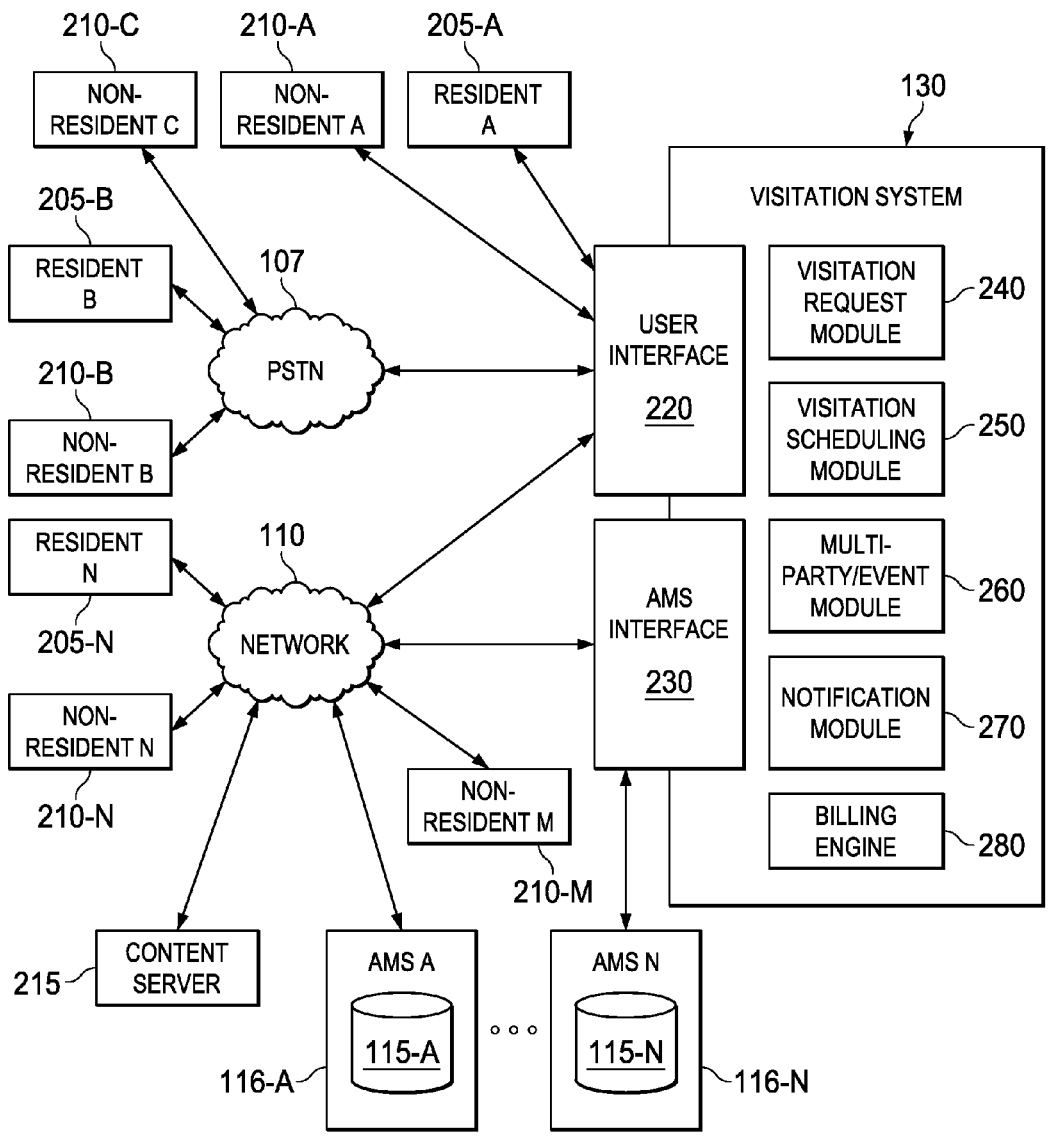
FIG. 2 is a diagram of an example of a video visitation system according to some embodiments.

Referring to FIG. 2, a block diagram of system 130 for providing visitation services to residents of a controlled-environment facility is depicted according to some embodiments. As shown, visitation system 130 includes user interface 220 and AMS or JMS interface 230. In some embodiments, residents and/or non-residents of one or more controlled-environment facilities may access, interact with, or otherwise use visitation system 130 via user interface 220. For example, user interface 220 may be provided as a web interface, IVR interface, or the like.

In some scenarios, resident 205-A and/or non-resident 210-A may connect to visitation system 130 via user interface 220. For example, resident 205-A and/or non-resident 210-A may directly or indirectly (e.g., through an officer or personnel of the controlled-environment facility) reach a computer terminal or a telephone disposed within a controlled-environment facility and request visitation services.

In other scenarios, resident 205-B, non-resident 210-B, and/or non-resident 210-C may interact with user interface 220 via PSTN 107 using an IVR system or the like. Additionally or alternatively, resident 205-N, non-resident 210-N, and/or non-resident 210-M may access a website, webpage, Internet portal, etc. via a computer network or Internet 110, for example, using a personal computing device (e.g., running a web browser), cell phone (e.g., via an "app"), prison terminal, or any other suitable client device. Content server 215 may be configured to provide electronic content (e.g., video, audio, television programming, motion pictures, etc.) to visitation system 130 via user interface 220, AMS interface 230, or any other suitable interface.

In some implementations, resident 205-B, non-resident 210-B, and non-resident 210-C may participate in the same multi-party or event-driven video visitation session concurrently and/or simultaneously. Similarly, resident 205-N, non-resident 210-N, and non-resident 210-M may share the same multi-party or event-driven visitation session. It should be noted that any number of residents and/or non-residents may participate in the same multi-party or event driven communication session.

When implemented to support web-based interactions, user interface 220 may be deployed using a number of suitable techniques. For example, user interface 220 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In some embodiments, visitation system 130 may interact with one or more AMS or JMS systems 116A-N either directly or via a computer network such as the Internet 110. As previously noted, each AMS or JMS system 116A-N may each include its own database 115A-N, respectively. Generally speaking, databases 115A-N may include any suitable type of application or data structure that may be configured as a persistent data repository. For example, databases 115A-N may be configured as relational databases that include one or more tables of columns and rows and that may be searched or queried according to a query language, such SQL or the like. Alternatively, databases 115A-N may be configured as structured data stores that include records formatted according to a markup language, such as XML or the like. In other embodiments, databases 115A-N may be implemented using one or more arbitrarily or minimally structured files managed and accessible through a corresponding type of application.

In addition to interfaces 220 and 230, visitation system 130 includes visitation request module 240, visitation scheduling module 250, multi-party/event module 260, notification or communication module 270, and billing engine 280. Visitation request module 240 may be configured to receive one or more visitation scheduling requests, modification requests, or cancellation requests, for example, via user interface 220. Visitation scheduling module 250 may be configured to execute an incoming request, for example, by scheduling a new multi-party or event-driven visitation, modifying a previously scheduled multi-party or event-driven visitation, or canceling the previously scheduled multi-party or event-driven visitation.

Multi-party/event module 260 may be configured to identify and process event requests for inmates and/or to enable multi-party visitation sessions. Notification module 270 may be configured to notify a party of a particular visitation, modification, cancellation, etc. Billing engine 280 may be configured to determine parameters such as a number of parties or devices participating in a multi-party session, a type of event, the particular content viewed during the event, a duration of the event, etc. and bill a resident or non-resident for the communication session depending upon those parameters. These, and other techniques, are illustrated in more detail below in connection with FIG. 4 below.

In various embodiments, modules 220-280 shown in FIG. 2 may represent sets of software routines, logic functions, and/or data structures that are configured to perform operations described herein. Although these modules are shown as distinct logical blocks, in other embodiments at least some of the functionality provided by these modules may be combined into fewer blocks. Conversely, one or more of modules 220-280 may be implemented such that it is divided among two or more logical blocks. Moreover, although shown with a particular configuration, in other embodiments these various modules may be rearranged in other ways.

Also, in certain embodiments, each of the different components of visitation system 130 may be implemented in software, hardware or any suitable combination thereof, in an integrated fashion (e.g., on a single server or computer system) or in a distributed fashion (e.g., via a number of discrete systems configured to communicate with one another via a network). Additionally or alternatively, the operation of visitation system 130 may be partitioned into components in a different fashion than illustrated in FIG. 2.

Figure 3:
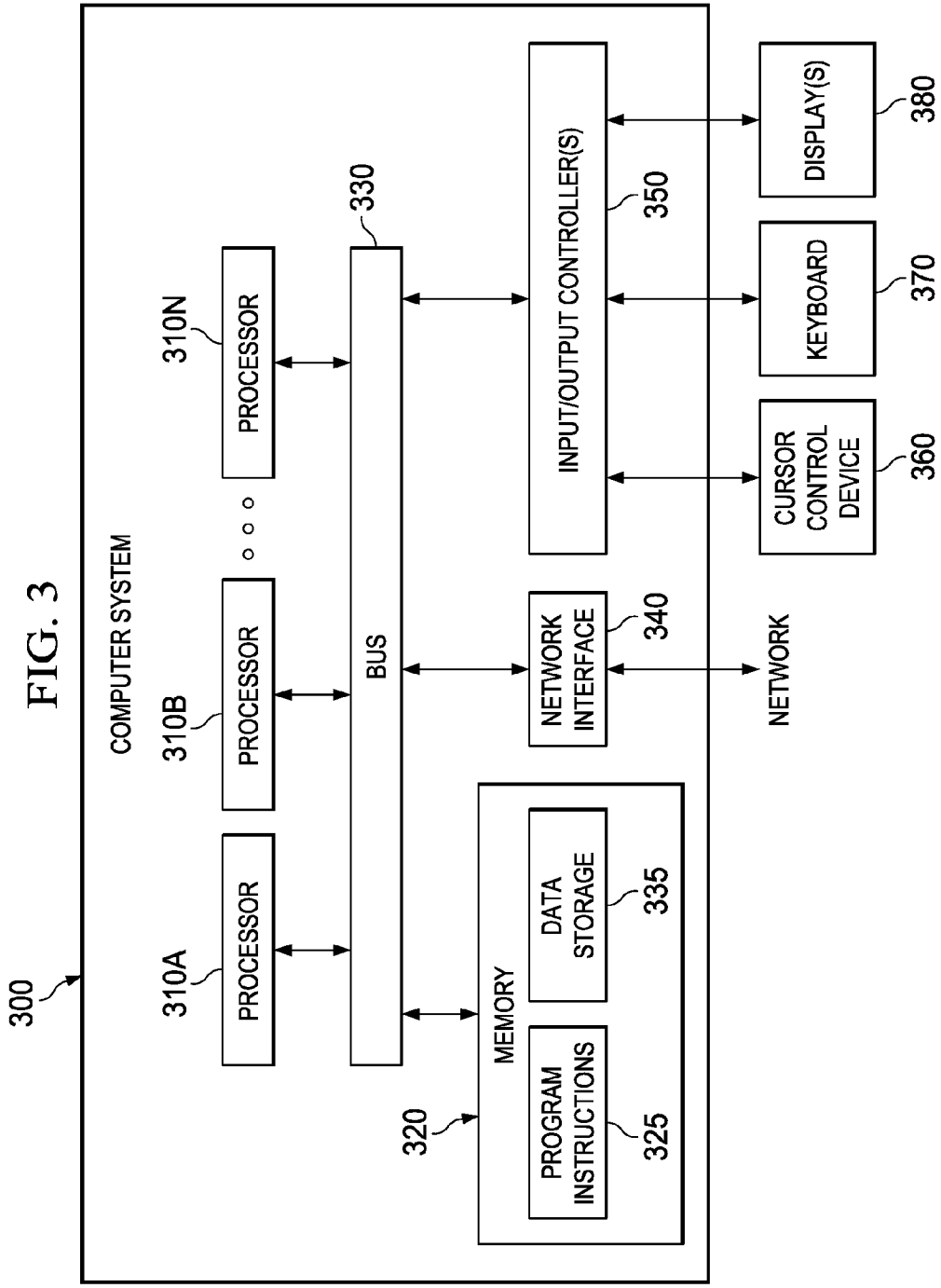
FIG. 3 is a block diagram of an example of a computer system configured to implement various systems and methods described herein according to some embodiments.

Embodiments of systems and methods for remote multi-party and/or event-driven visitation for residents of controlled-environment facilities, as described herein, may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, one or more of blocks 201-206 shown in FIG. 2 may be implemented as computer system 300. Moreover, one or more of communication devices 103, 104, and 113; communication system 101; and visitations system 130 may include one or more computers in the form of computer system 300. As explained above, in different embodiments these various computer systems may be configured to communicate with each other in any suitable way, such as, for example, via network 110.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360-380 may be capable of communicating with I/O controllers 350, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the device, including network interface 340 or other peripheral interfaces, such as input/output devices 350. In some embodiments, bus 330 may perform any necessary protocol, timing or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all of the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated herein. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 4:
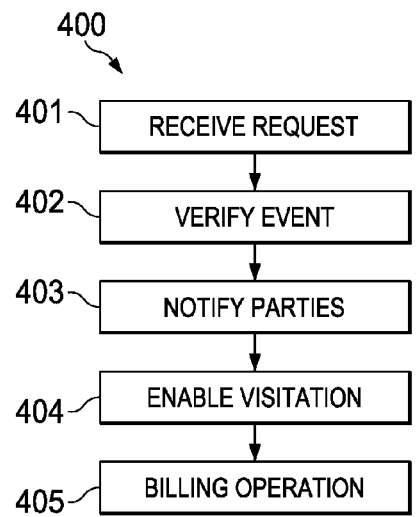
FIG. 4 is a flowchart of an example of a method for remote group, multi-party, and/or event-driven visitation according to some embodiments.

Turning now to FIG. 4, a flowchart of method 400 for a remote group, multi-party, and/or event-driven visitation is depicted. In some embodiments, method 400 may be performed, at least in part, by video visitation system 130 of FIG. 1. As shown, at block 401, method 400 may include receiving a request for a remote group, multi-party and/or event-driven visitation from a resident and/or from a non-resident of a controlled-environment facility. Such a request may be received, for example, via user interface 220 at visitation request module 240 of visitation system 130. In some cases, the request for visitation may be received in a format such as, for example, via the Internet (e.g., as an HTTP message or the like,), by e-mail, text message, Short Message Service (SMS) communication, telephone call, IVR input, etc.

When received from a resident, the request may specify one or more individual non-residents (e.g., by first and last name, by telephone number, by address, by driver's license or social security number, etc.) and/or other residents with whom the resident wishes to have a video visitation session. Conversely, when received from a non-resident, the request may specify one or more individual residents (e.g., by inmate identification number, by name, by driver's license or social security number, etc.) and/or other non-residents with whom the non-resident wishes to have the video visitation session. Additionally or alternatively, the request may identify a category of or group of individuals, such as, for example, "siblings," "parents," etc.

Additionally or alternatively, the request may indicate a desired date of the group, multi-party, or event-driven video visitation, a desired time of the remote multi-party or event-driven video visitation, and/or a desired duration of the multi-party or event-driven video visitation. Additionally or alternatively, the request may include an identification of one of a plurality of controlled-environment facilities, an identification of one or more of a plurality of different locations for the multi-party or event-driven video visitation within a given controlled-environment facility, or an identification of one or more of a plurality of different video visitation terminals within the given controlled-environment facility.

Also at block 401, visitation scheduling module 250 may receive the incoming request and make one or more determinations about the desired remote multi-party or event-driven video visitation. For example, when the request identifies a category of individuals (as opposed to one or more particular individuals), visitation scheduling module 250 may identify a list of persons whose visitation is being requested. In an embodiment, visitation scheduling module 250 may interact with one or more of databases 115A-N to determine a list of available persons for an inmate. In some implementations, the identified list may be specifically suited for the requesting inmate's particular circumstances.

Still at block 401, the request may identify an event by name, type, location, date, and/or time. For example, the request may inform that the requested group, multi-party and/or event-driven visitation session relates to a birthday, funeral, wedding, graduation, or any other suitable event such that, during the visitation session, the resident(s) and/or non-resident(s) may be allowed to remotely view, attend, or participate in the event using a communication device within the controlled-environment facility or outside of the controlled-environment facility.

In some situations, the event may take place outside of the facility. One or more non-residents may attend the event and broadcast a video feed, audio feed, and/or pictures of the event to visitation system 130 (e.g., using a communication device), which in turn provides that content to the resident's communication device within the facility. In other cases, the event may take place within the facility. The resident and/or facility personnel may broadcast a video feed, audio feed, and/or pictures of the event to visitation system 130 (e.g., using a communication device), which then provides that content to one or more non-residents' communication devices outside of the facility.

In some embodiments, the event may include a television program, a home video presentation, a slideshow presentation, a motion picture, etc. For example, such content may be provided by content server 215 of FIG. 2. During the requested group, multi-party and/or event-driven visitation session, the resident may use a communication device within the controlled-environment facility to view the event simultaneously with one or more non-residents.

When the event is to take place outside of the facility, for instance, block 401 may include a scheduling negotiation between visitation system 130 and a non-resident requesting the session. Particularly, because the facility may have visitation rules that determine when visitation is available to its residents, how many visitors a resident can have during a given time period, etc., there may be a conflict between those rules and the type or time of the event, number of session participants, number of event attendees, etc. Accordingly, in some cases, visitation system 130 may provide the available schedule and/or other parameters to the requestor prior to the requestor's scheduling of the event.

Accordingly, also at block 401, method 400 may include identifying one or more predetermined rule(s) that is/are applicable to the request. For example, multi-party/event module 260 may determine the identity of the resident and/or non-resident that will participate in the remote multi-party or event-driven video visitation session based upon the request, and may retrieve one or more rules that are associated with that resident and/or non-resident(s). Additionally or alternatively, multi-party/event module 260 may determine the desired date, time, and/or duration of the session identified in the request, and it may retrieve one or more rules that are associated with the type of event, date, time, and/or duration. Additionally or alternatively, multi-party/event module 260 may determine the identification the controlled-environment facility, location, and/or terminal within the given controlled-environment facility in the video visitation request, and it may retrieve one or more rules that are associated with the facility, location, resident, non-resident, and/or terminal.

In some embodiments, these one or more rules may prescribe one or more constraints for remote multi-party or event-driven video visitation involving the resident and/or the non-resident(s), as well as one or more constraints associated with a one of a plurality of predefined groups or categories to which the resident or the non-resident(s) belong. Examples of groups or categories of residents include, for instance, general population inmates, inmates that belong or are suspected to belong to a particular gang or (criminal) organization, inmates that have had good behavior or are otherwise designated as "trustees," etc.

For example, in some implementations, inmates or groups of inmates may generally be designated as "trustees" after proving to officials in their correctional facilities that they can be trusted to do one or more of: (a) reliably perform one or more tasks, (b) exhibit timely behavior, (c) not attempt to escape, etc. In some cases, depending upon the circumstances and facility's regulations, an inmate may have had to serve a certain amount of his or her sentence to be eligible for trustee status; which may also be restricted based upon the inmate's prior or current conviction(s) (e.g., convicted murderers may not be eligible for trustee status).

Still referring to block 402, again, each rule may have one or more constraints. These constraints may indicate, for example, a maximum number of video visitations, a maximum duration of all video visitations, and/or a maximum number of events or of a certain type of event that a resident or non-resident is/are allowed to have for a given time period. For instance, a particular inmate may only have 1 hour of multi-party or event-driven video visitation available per month, whereas another inmate may have 2 hours of multi-party or event-driven video visitation available per week. Additionally or alternatively, a given inmate may have the opportunity to participate in up to 2 distinct sessions per week and a maximum number of visitations of 1 per day, while a different inmate may only be allowed to participate in 1 video session per week, with a maximum of 2 per month. Any other suitable restrictions may be similarly placed upon different non-residents and/or groups or categories of non-residents.

In other embodiments, rule constraints may indicate a location within a controlled-environment facility, video visitation terminal, or communication device within the controlled-environment facility where a resident and/or non-resident may (or may not) conduct the remote multi-party or event-driven video visitation. For example, a particular inmate may be prohibited to participate in a session from one or more predetermined prison locations, or the inmate may only be allowed to participate in the session from other certain location(s). Similarly, an inmate and/or non-resident may only be allowed to participate in a session while operating a particular terminal or device, or may be prohibited from using a given device. In some cases, locations within a controlled-environment facility may be identified by wing, area, or cell. Meanwhile, terminals may be identified by serial number, Internet Protocol (IP) address, Media Access Control (MAC) address, or the like.

At block 402, method 400 may include verifying the event associated with the request. For example, facility personnel may determine whether the birthday, funeral, wedding, graduation, etc. is legitimate by performing or commissioning an investigation. In some cases, multi-party/event module 260 may consult electronic sources to determine the veracity of the event. For example, a marriage license database, electronic newspaper obituaries, school enrollment database, television programming guides, etc. may be used to help determine whether the event-driven request is genuine.

At block 403, if all rule parameters are satisfied and multi-party/event module 260 schedules the multi-party and/or event driven session, notification module 270 may notify the interested or affected parties to the session. In some cases, the notification may be provided in the form of e-mail, text message, SMS communication, telephone call, etc.

At block 404, method 400 includes enabling the group, multi-party, or event-driven visitation. For example, visitation system 130 may receive a video signal, and audio signal, and or other suitable signal, including but not limited to packetized signals, from a resident, a non-resident, and/or content server 215, and may distribute those signals across the communication devices operated by participants of the session. When the session is over or scheduled to be over, visitation system 130 may terminate each respective connection.

In some cases, while enabling the session, visitation system 130 may record and/or allow an investigator or facility personnel to monitor the group, multi-party, or event-driven visitation using his or her own communication device or computer system. Specifically, in some cases, the investigator may be added as a participant to the session, and may be able to access the video signal and/or audio signal accessible by the resident and/or non-resident(s).

At block 405, billing module 280 may bill the resident and/or non-resident(s) for the group, multi-party, or event-driven visitation session. In some cases, the resident or at least one or more non-residents may be billed, at least in part, depending upon a number of persons participating in the session and/or the number of communication devices involved in the remote group visitation session. Additionally or alternatively, resident and/or non-resident(s) may also be billed according to the type of event, duration of the event, date and/or time of the event, television program or motion picture, etc. In some cases, an amount billed to resident due to a group, multi-party, or event-driven visitation session may be collected from the resident's calling account, commissary account, or the like.

Figure 5:
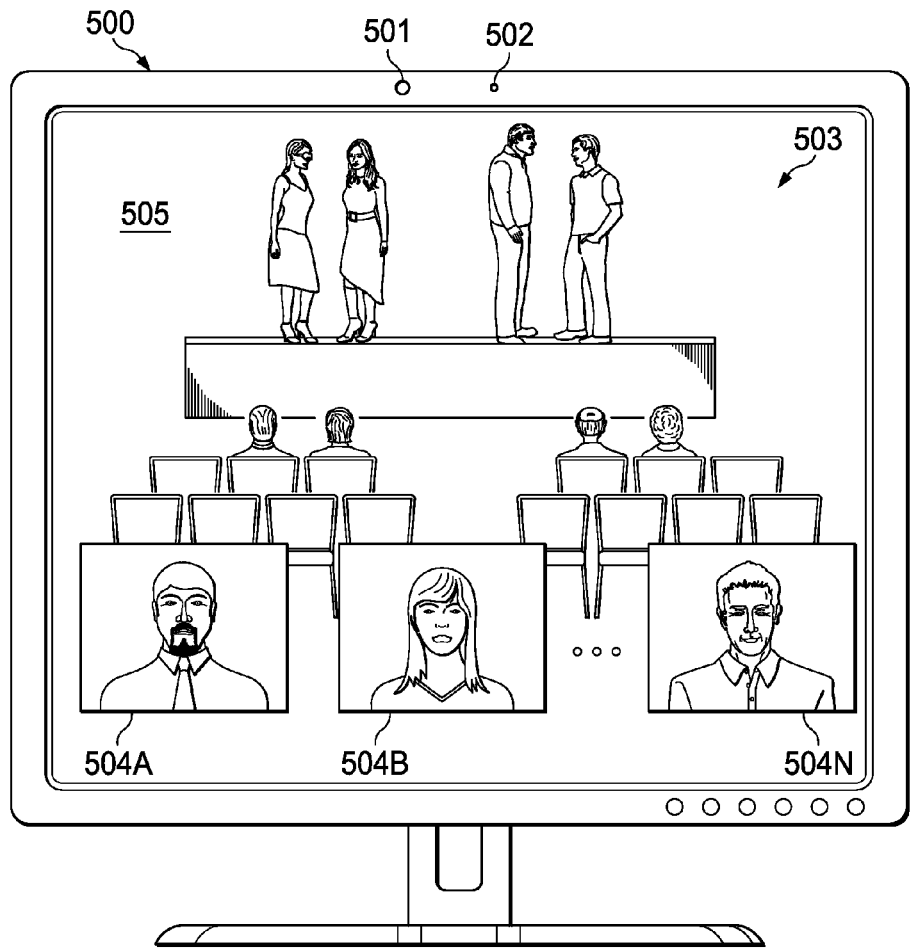
FIG. 5 is a simulated screenshot of an example of a Graphical User Interface (GUI) for remote group, multi-party, and/or event-driven visitation according to some embodiments.

FIG. 5 is a simulated screenshot of an example of a Graphical User Interface (GUI) for multi-party and/or event-driven visitation. In some embodiments, GUI 503 may be displayed by communication device 500, which includes camera 501 and microphone/speaker 502. In some implementations, communication device 500 may be used as one of devices 102-104 shown in FIG. 1.

In this example, an event or content is displayed in portion 505 of device 500, a live video feed of a resident of a controlled-environment facility as captured by camera 501 is shown at portion 504A, and live video feeds of two or more non-residents are shown at portions 504B-N. The audio portion of the session may be captured by microphone 502 and reproduced via a speaker or earphone (not shown).

In some embodiments, each participant to the session may operate a device similar to device 500. When the event is taking place outside of the facility, a non-resident may operate his or her device to activate two cameras simultaneously; a rear-facing camera (to capture the event shown in portion 505) and a front-facing camera (to capture the non-resident's own likeness). Thus, that particular non-resident may be seen as the event-broadcasting party, and all other parties may be considered video conferencing parties. Each party may have a similar GUI in their own communication devices, and may be able to verbally communicate with other parties using their respective microphones and speakers. In various implementations, each of display portions 504A-N and 505 may be opened, closed, resized, and/or moved by the device's operator.

It should be understood that the various operations described herein, particularly in connection with FIG. 4, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
performing, by one or more computer systems:
receiving a request to initiate a remote group visitation session between a resident of a controlled-environment facility and two or more non-residents of the controlled-environment facility; and
enabling the remote group visitation session, wherein during the session the resident is allowed to communicate with the two or more non-residents, and wherein a first non-resident of the two or more non-residents broadcasts a live video feed of an event and a live video feed of the first non-resident within the remote group visitation session.

2. The method of claim 1, wherein the controlled-environment facility is a correctional facility and wherein the resident is a prisoner, inmate, detainee, or arrestee.

3. The method of claim 1, wherein the request is originated by the resident.

4. The method of claim 1, wherein the request is originated by one of the two or more non-residents.

5. The method of claim 1, wherein the remote group visitation session includes a video conference.

6. The method of claim 1, wherein the request includes at least one of: a date of the remote group visitation session, a time of the remote group visitation session, or a duration of the remote group visitation session.

7. The method of claim 1, wherein the request indicates the event broadcast by the first non-resident.

8. The method of claim 7, wherein the event is selected from the group consisting of: birthday, funeral, wedding, and graduation.

9. The method of claim 7, wherein the event includes a television program, a home video presentation, a slideshow presentation, or a motion picture, and wherein during the session the resident and the two or more non-residents are allowed to view the event concurrently.

10. The method of claim 1, further comprising billing the resident or at least one of the two or more non-residents at least in part depending upon a number of persons participating in the remote group visitation session.

11. The method of claim 1, further comprising billing the resident or at least one of the two or more non-residents at least in part depending upon a number of communication devices involved in the remote group visitation session.

12. A video visitation system, comprising:
   at least one processor; and
   a memory coupled to the at least one processor, the memory configured to store program instructions executable by the at least one processor to cause the video visitation system to:
      receive a request to initiate a video visitation session between at least one resident of a correctional facility and at least one non-resident of the correctional facility, wherein the request indicates an event associated with the video visitation session; and
      enable the video visitation session, wherein during the session the at least one resident is allowed to communicate with the at least one non-resident, wherein a first non-resident of the at least one non-residents broadcasts a live video feed of the event and a live video feed of the first non-resident within the video visitation session.

13. The video visitation system of claim 12, wherein the program instructions are further executable by the at least one processor to cause the video visitation system to, prior to receiving the request, provide information to the at least one resident or the at least one non-resident about an available schedule for the video visitation session.

14. The video visitation system of claim 12, wherein the event is selected from the group consisting of: birthday, funeral, wedding, and graduation.

15. The video visitation system of claim 12, wherein the event includes a television program, a home video presentation, a slideshow presentation, and a motion picture, and wherein during the session the resident and the two or more non-residents are allowed to view the event simultaneously.

16. A non-transitory, tangible computer-readable storage medium having program instructions stored thereon that, upon execution by a computer-based visitation system, cause the computer-based visitation system to:
   receive a request to initiate a remote group visitation session between a resident of a controlled-environment facility and two or more non-residents of the controlled-environment facility; and
   enable the remote group visitation session, wherein during the session the resident is allowed to communicate with the two or more non-residents, and wherein a first non-resident of the two or more non-residents broadcasts a live video feed of an event and a live video feed of the first non-resident within the remote group visitation session.

17. The computer-readable storage medium of claim 16, wherein the controlled-environment facility is a correctional facility and wherein the resident is a prisoner, inmate, detainee, or arrestee.

18. The computer-readable storage medium of claim 16, wherein the request is originated by the resident.

19. The computer-readable storage medium of claim 16, wherein the request is originated by one of the two or more non-residents.

20. The computer-readable storage medium of claim 16, wherein the remote group visitation session includes a video conference.

\* \* \* \* \*